Oct. 28, 1924.

R. R. WILSON

COMBINATION LOCK

Filed May 31, 1922

1,513,721

5 Sheets-Sheet 1

INVENTOR.
ROBERT R. WILSON
BY
ATTORNEYS.

Oct. 28, 1924.   1,513,721
R. R. WILSON
COMBINATION LOCK
Filed May 31, 1922    5 Sheets-Sheet 2
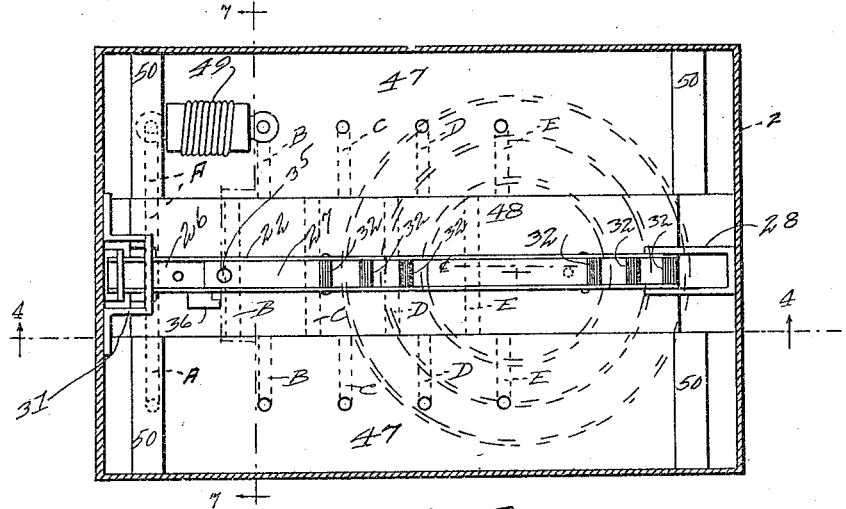
Fig. 3
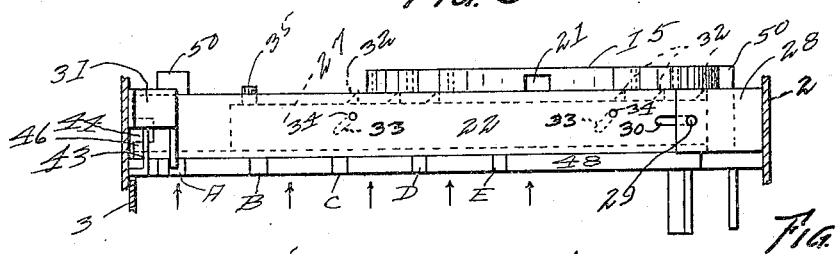
Fig. 4
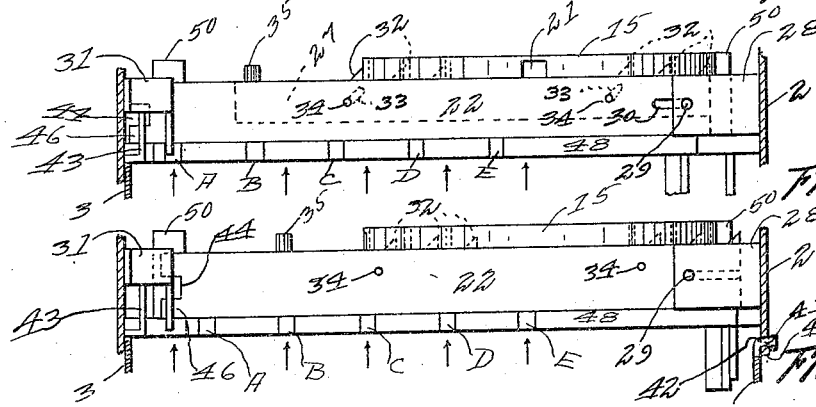
Fig. 5
Fig. 6
INVENTOR.
Robert R. Wilson
BY
ATTORNEYS.

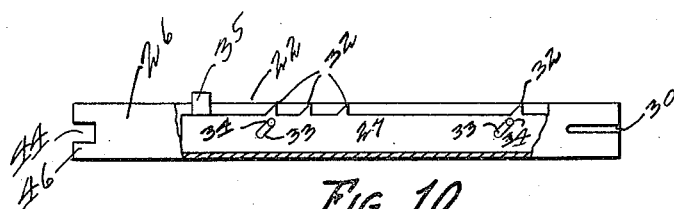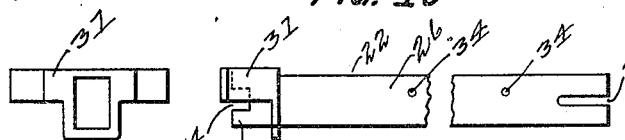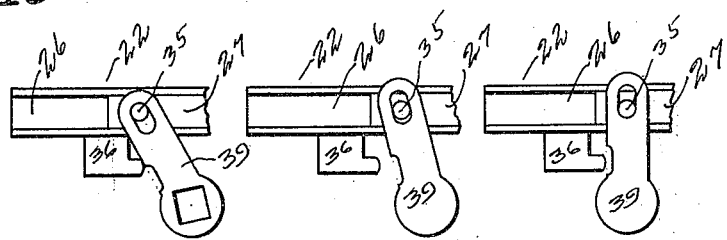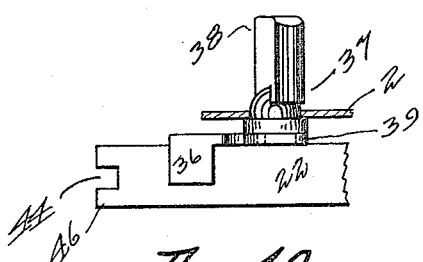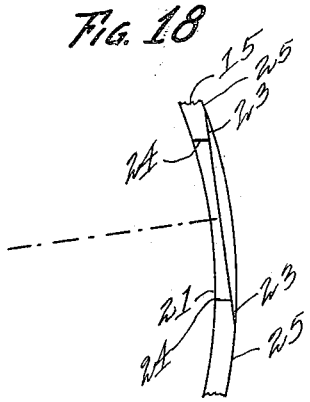

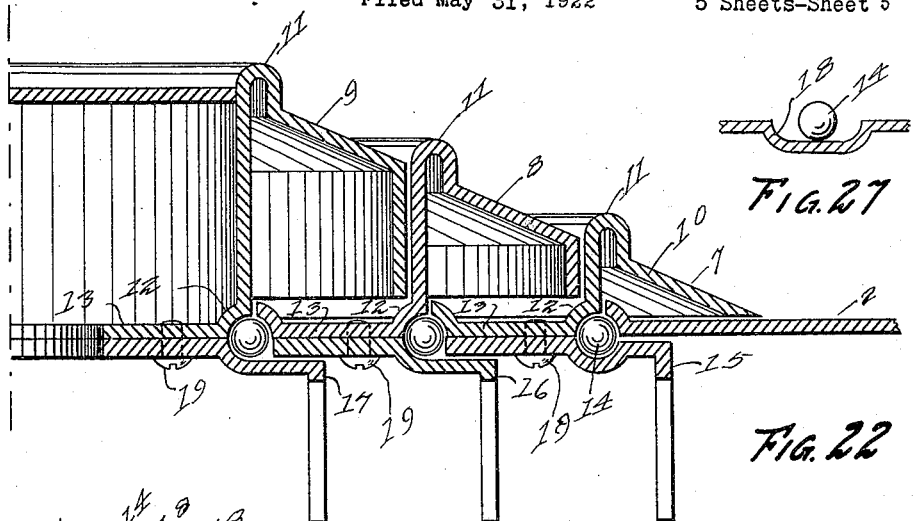
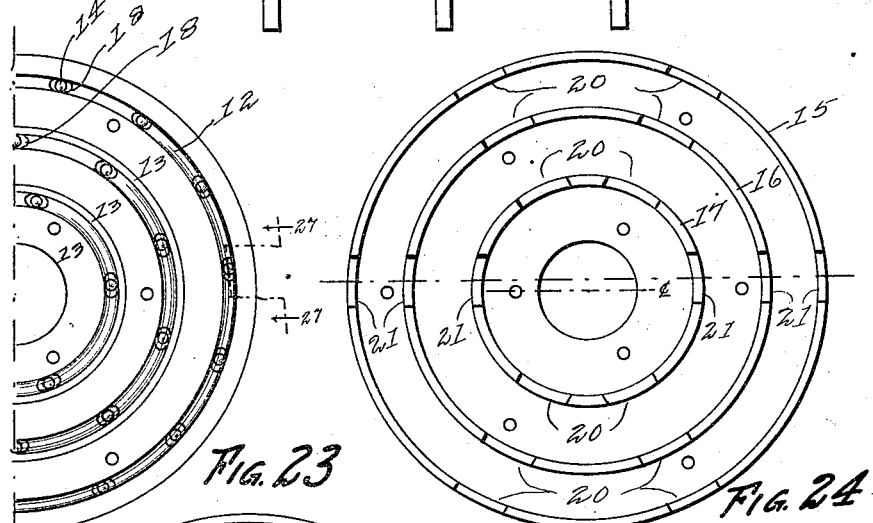
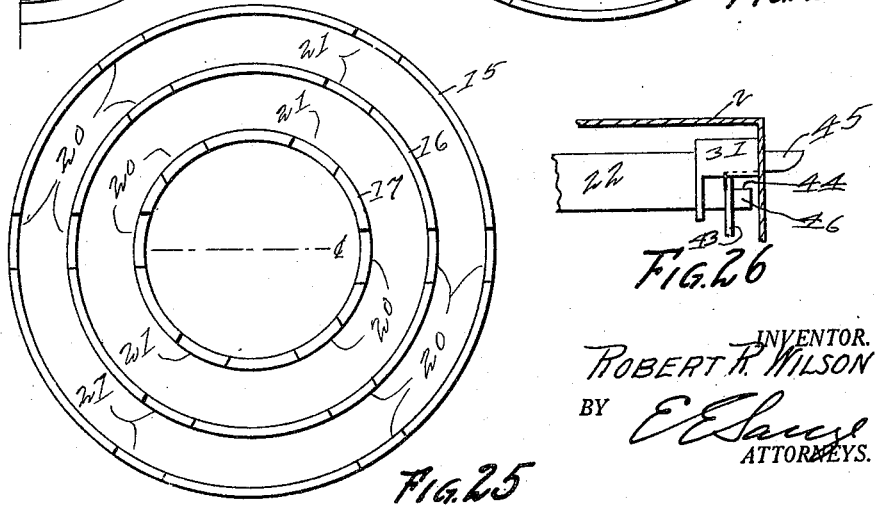

Patented Oct. 28, 1924.

1,513,721

UNITED STATES PATENT OFFICE.

ROBERT R. WILSON, OF SPOKANE, WASHINGTON, ASSIGNOR OF FORTY-FIVE PER CENT TO FRANK A. JONAS, OF WAITSBURG, WASHINGTON; FIVE PER CENT TO G. WILSON, OF SPOKANE, WASHINGTON; AND FIVE PER CENT TO A. V. BIBEAU, OF WALLA WALLA, WASHINGTON.

COMBINATION LOCK.

Application filed May 31, 1922. Serial No. 564,942.

*To all whom it may concern:*

Be it known that I, ROBERT R. WILSON, a citizen of the United States of America, residing at Spokane, in the county of Spokane and State of Washington, have invented certain new and useful Improvements in Combination Locks, of which the following is a specification.

This invention relates to combination locks and is designed more particularly for automobile use where it is desirable to have the electric circuits thereof under positive control of the legitimate operator only.

Its purpose is not restricted to automobile use however as it is equally applicable to locking purposes, and to the combination of locking and circuit control.

One of the objects of the invention is to provide a combination lock whose general form makes it peculiarly applicable to locking electric sliding switches in an inoperative position with respect to the work it controls.

Another object of the invention is to provide a combination lock, the bolt of which may be thrown to the locked position without interference, but which cannot be returned to the unlocked position without knowledge of the combination.

A further object of the invention is to provide a combination lock which is enclosed within a casing and whose action prevents access when in the locked position.

With these and other objects in view reference is now had to the accompanying drawings in which—

Figure 1:
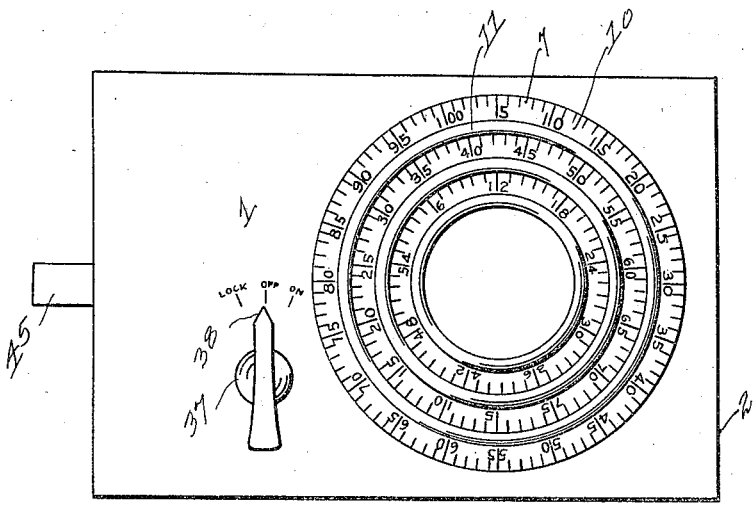
Figure 2:
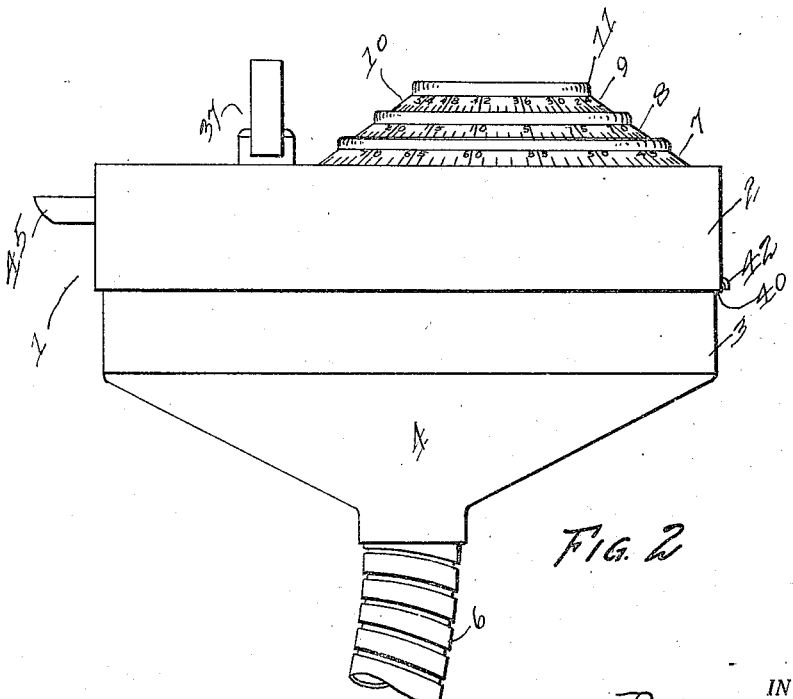
Figure 7:
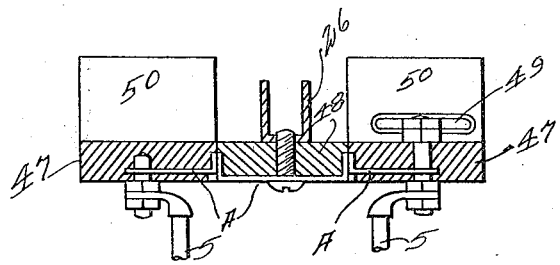
Figure 8:
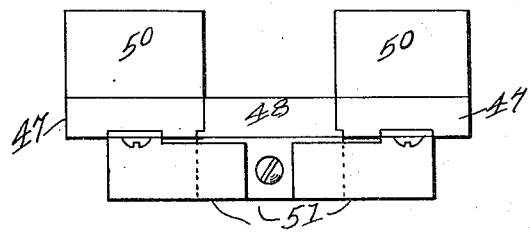
Figure 9:
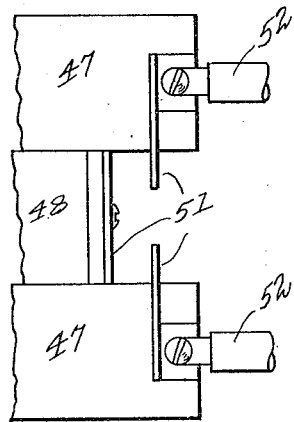

Fig. 1 is a plan view of the lock;
Fig. 2 is a side elevation thereof;
Fig. 3 is a plan view with the top removed;
Figs. 4, 5 and 6 are views showing a side elevation of the bolt, on the line 4—4 of Fig. 3, in various positions;
Fig. 7 is a cross section of the sliding switch, on the line 7—7 of Fig. 3;
Fig. 8 is an end elevation thereof;
Fig. 9 is a plan view from below of the starter contact points;
Fig. 10 is a side elevation of the bolt with part cut away showing ratchet bar;
Fig. 11 is an end view thereof;
Fig. 12 is a side elevation of the bolt showing the front bolt guide;
Fig. 13 is a side elevation of the rear bolt guide;
Fig. 14 is a plan view thereof;
Fig. 15 is a rear elevation of the front bolt guide;
Figs. 16, 17 and 18 is a plan view of the locking lever in various positions;
Fig. 19 is a side elevation of the locking lever and turn button;
Fig. 20 is a plan view of the turn button;
Fig. 21 is a section of a tubular ring, enlarged, showing constructional details of the ring notches;
Fig. 22 is a sectional elevation of one half of the dial plates and the tubular rings;
Fig. 23 is a half plan view of the tubular rings;
Fig. 24 is a plan view from below of the tubular rings with ring notches in the operative position;
Fig. 25 is a similar view to Fig. 24 with the ring notches in the inoperative position;
Fig. 26 shows constructional details of the bolt, modified for use as a locking bolt; and
Fig. 27 is a sectional view of a ball cage taken on the line 27—27 of Fig. 23.

Having reference to the drawings like numerals refer to like parts throughout the several views and the numeral 1 refers to the assembled lock the case of which consists of two portions, a front portion 2 and a back portion 3 terminating preferably in a rearwardly extending transition piece 4 to provide ample space therein for electric wires 5, shown in Fig. 7, which may be passed out through the armored tubing 6.

The front and back portions are locked together in a novel manner which will be presently explained.

A plurality of indicating dials, 7, 8 and 9 respectively, are formed preferably of pressed, or stamped, sheet metal and are formed in a manner to provide in one piece the face plate 10 upon which is stamped the indicating characters as shown, a raised portion 11 as an aid to gripping the dials, a bearing race 12, and an inwardly extending flange 13.

The outer dial is rotatably mounted, preferably with anti-friction bearings represented by the balls 14, in the outer or front portion of the case, a part of the dial having formed therein one part of the race 12 for the bearing, and this part extending inwardly to form a part of the race for the bearing of the next successive dial continuing with each dial to the central dial 9 which obviously is required to form part of one race only. Each dial thus supports its outer fellow in which it is rotatably mounted.

The bearings are completed by the addition of the tubular rings 15, 16 and 17 respectively, which are provided with a series of cages 18, in which the balls are contained in their proper spaced relation; thus the rings, with their cooperating dials, form the complete bearing races.

The rings are likewise preferably formed of pressed or stamped metal and are rigidly and removably attached to the dials with which they rotate, by the bolts or screws 19. By this means the rings may be attached to the dials in various combinations, and the combination changed from time to time by readjusting the rings on said dials.

The tubular rings are each provided with a series of slots consisting of false slots 20 and operable slots 21 all of which are positioned eccentrically or off center; with the difference however that the false slots are positioned continuously out of operative alignment with a ratchet bolt 22 (which will be presently explained), while the operative slots are in operative alignment of the bolt, in one position of the dial only, this position corresponding to the position of the ratchet bolt which is placed in case to one side of the center of the rings.

The eccentricity is given to the false slots by cutting each of the diametrally opposite slots off center with respect to the diametral line, with one of the slots on one side thereof and the other slot on the other, thus forming a broken path. The operative slots on the other hand are positioned so that they form an unbroken path, with both slots on the same side of the center line so that they will register with the bolt when the dial is moved to one position only but not with it moved to its opposite position, thus providing an increased number of combinations.

To further prevent successful tampering with the lock the outer edges of the slots are reduced on a plane 23 at right angles to the center line of the slots, as shown in Fig. 21, to prevent any part of the bolt being prematurely touched by the edge formed by the acute angle of the side 24 and the periphery 25 of the tubular rings during rotation of the dials.

The ratchet bolt 22 is slidably mounted in the case and consists of a bolt 26, channelled in section, and a ratchet bar 27, one end of the bolt being carried by the bearing member 28 which is provided with tits 29 designed to engage the slot 30 of the bolt, while the other end is mounted in the clip 31 which is projected to engage the bolt at a distance back from the end practically equalling the distance of throw of the bolt during operation.

The ratchet bar 27 may also be of channel section in which case it is inverted with respect to the bolt 26 to utilize the back thereof from which the teeth 32 may be formed, and contains slots 33 diagonally positioned, through which are passed the pins 34 made fast in any suitable manner to the bolt 26. A pin 35 is rigidly attached to and extends from one end of the bar to be engaged by the operating means, and a safety catch 36 is rigidly attached to the bolt in the path of the operating means.

The bolt 22 is positioned off center to correspond with the operable slots in the rings, as above mentioned, which brings the ratchet bar 27 into position to register with the slots when the bar is raised to expose the teeth 32. The bar is raised by the manual operation of the operating means which is designed to move the bar (in this case) to the right to retract it and to the left to advance it, and consists of a button 37 provided with an arrow point 38, with the button rotatably mounted in the case through which it extends to engage the locking lever 39 which in turn operably engages the pin 35.

It will now be noted that by moving the turn button 37 clockwise the ratchet bar is given a diagonal sliding movement independent of the bolt 26 which is unaffected thereby until the bar 27 has travelled the full distance of the diagonal slots, when having reached the end of the slots the bolt is carried with it to the completion of the retraction movement.

Thus the movement of the bolt 26 is dependent upon the movement of the ratchet bar 27, and conversely the movement of the bar is restricted with respect to the bolt.

The diagonal movement of the ratchet bar raises and exposes the teeth 32, which when the dials are moved until the slots are out of registerable position, being intercepted by the tubular rings, prevents any movement of the bolt 26; but with the rings rotated according to a predetermined combination, the bar 27 continues to the completion of its movement and carries with it the bolt 26 as above explained.

Now with the bolt fully retracted, the dials and rings may be rotated and the position of the slots changed out of register with the bar; this however will not interfere with advancing the bolt for by advancing the bar 27 the diagonal slots and pins withdraw the teeth, which becoming concealed will then disengage themselves from the rings and permit the advancing (locking) movement to be completed.

Should forced retraction be attempted, say for driving a punch through the side wall of the case and against the end of the bolt 26, the safety catch 36 would be obstructed by the locking lever 39 positioned in its path, which being pushed back would raise and move the ratchet bar 27 until the teeth would strike the aforesaid rings when further retraction would be impossible.

The two portions of the case are locked together on the inside by the bolt 26 in the following manner:

The edge 40 of the front portion 2 of the case is provided with holes 41, see Fig. 6, and the back portion is provided with lugs 42 which engage hinge-like the front portion through these holes; the back portion is also provided with a perforated lip 43 positioned opposite to the lugs and is offset inwardly to be engaged by the forward end of the bolt which in turn is notched at 44 for the purpose.

Thus by bringing the two portions together and, after closing them advancing the bolt, the two portions are securely locked and cannot be opened without a knowledge of the combination.

Where the lock is used on doors, or the like, the bolt 26 is extended through the case, with the nose 45 thereof projecting in the usual manner.

By noting Fig. 26 the advantage of the notch 44 in the bolt 26 is apparent for it provides a short tongue 46 on the bolt wherewith to engage the perforated lip 43 which obviously could not be thus engaged otherwise on account of the extended nose 45.

The electric features of the device consist of a pair of stationary contact bars 47 provided with contact points A, B, C, D, and E, which are preferably cast therein, as shown in Fig. 7; a movable contact bar 48 operably mounted between the contact bars and rigidly attached to and movable with the bolt 26, and also provided with contact points A, B, C, D, and E; and a resistance coil 49.

The same characters are used to designate the contact points of both the stationary and movable points as these points when in contact combine as one to complete the respective circuits.

The stationary bars are attached to the front portion 2 of the case in any suitable manner, and are preferably provided with spacing legs 50 positioned perpendicular to the contact bar to maintain it a proper distance from the front plate of the case wherewith to properly engage the movable bar 48.

While both the stationary and movable bars have a like number of contact points they are spaced different so that when the movable bar 48 is retracted with the bolt 26 the points B, C, D, and E are in contact, with the point A out of contact, and conversely with the movable bar advanced the points A are in contact and the points B, C, D, and E are out of contact. These relative positions are shown clearly in Figs. 4, 5 and 6 by the arrows which represent the stationary contact points. Thus with the lighting circuit connected to the points A and B, and the stationary bar retracted, the current will pass through the points B avoiding the coil 49, but when this bar is advanced the point A is in contact and the current which thus passes through the coil, cuts down the voltage until a 6 volt current becomes say, a 2 volt current, sufficient only to light the dimmers but not strong enough for ignition purposes, hence should an unauthorized person attempt to connect this light circuit into the ignition circuit the spark would be insufficient to start the engine.

On one end of each of the contact bars is mounted additional contacts points 51 of larger capacity and to these are connected the starting terminals 52. These points are likewise positioned on the movable bar to break the contact when the other circuits B, C, D, and E are broken.

Now by the proper manipulation of the indicating dials the operative slots are positioned in line to register with the ratchet bolt which may now be retracted by the proper turning of the turn button. This action withdraws the nose of the bolt, or where the nose is not used, completes the circuits B, C, D, and E, or both, and thus the lock is rendered operable. The reverse movement breaks the circuits so that by turning the button anti-clockwise, (without considering the dials) the only available current passes through the coil and hence the car cannot be started.

All parts herein contained in conflict with my former application for patent filed April 29, 1920, Serial No. 377,456, on combination lock and electric switch, are expressly disclaimed.

Having thus described my invention, I claim.

1. In a combination lock, a case, indicating dials rotatably mounted on said case, slotted tubular rings rotatable with said dials, a ratchet bolt slidably mounted in said case in operable contiguity with said rings, means to lock said bolt, when in the locked position, against forced retraction.

2. In a combination lock, a case, indicating dials on said case, tubular rings attached to and rotatable with said dials, said rings provided with a plurality of slots positioned off center, a ratchet bolt slidably mounted in said case adjacent to said rings, and external means for operating said bolt.

3. In a combination lock, a case, indicating dials rotatably mounted in said case and provided with anti-friction bearings, slotted tubular rings rigidly attached to and rotatable with said dials, and having the slots thereof positioned off center, a ratchet bolt slidably and operably mounted in said case, the ratchet of said bolt being registerable with the slots of said rings, a safety catch attached to and movable with said bolt, means to obstruct said catch and prevent forced retraction of said bolt, and a turn button rotatably mounted in said case and operably connected with said ratchet bolt.

4. In a combination lock, a case, a plurality of indicating dials, the outer of which is rotatably mounted in said case, with each succeeding dial successively rotatably mounted in and supported by its outer fellow, slotted tubular rings removably and rigidly attached to and movable with said dials, the slots in said rings consisting of false and operable slots, the outer edges thereof being reduced on a plane at right angles to the center line of said slots, a bolt slidably mounted in said case and carrying a disappearing ratchet bar positioned to register with the slot of said rings, a safety catch attached to said bolt and positioned in the path of and to be obstructed by a ratchet lever to prevent forced retraction of said bolt, and a turn button rotatably mounted in said case, a locking lever rigidly attached to and movable with said turn button, and said locking lever operably connected to said ratchet bar.

5. In a combination lock, a case, a plurality of indicating dials, the outer of which is rotatably mounted, with anti-friction bearings, in said case, and the others of which are successively rotatably mounted, with anti-friction bearings, each in its outer dial, a tubular ring adjustably attached to each of said dials, said rings provided with a plurality of false and operable slots, positioned off center, a bolt slidably mounted in said case, a ratchet bar slidably mounted in said bolt in registerable position with the slots of said rings, and means to operate said ratchet bar and bolt.

6. In a combination lock, a case, a plurality of pressed indicating dials, the outer of which is rotatably mounted, with anti-friction bearings, in said case, part of said outer dial having formed therein one part of the race for said bearing with the said part of the dial extended inwardly to form one part of the race for the bearing of the next successive dial, continuing with each dial, the central dial forming but part of one race, and the case forming part of the race for the first mentioned bearing, slotted tubular rings attached to said dials, each of said rings forming with its cooperating dial a complete race, the slots in said rings consisting of false and operative slots, said false slots positioned off center and continuously out of operative alignment, and the operative slots positioned off center and in operative alignment in one position only of the rings, a bolt slidably mounted in said case, a ratchet bar movably mounted in said bolt in registerable position with the operable slots of said rings, said ratchet bar designed for limited movement independent of said bolt, and means to manually operate said bar.

7. In a combination lock, a case, indicating dials rotatably mounted in said case and carrying slotted rings, with the slots thereof positioned off center, a bolt slidably mounted in said case, a ratchet bar mounted in said bolt in registerable position with said rings, means to provide an independent movement, in a diagonal path, to said bar, and a dependent sliding movement to said bolt, and means to manually operate said ratchet bar.

8. In a combination lock, a case, indicating dials carrying slotted rings mounted in said case, a bolt slidably mounted in said case, a ratchet bar, provided with teeth, slidably mounted in said bolt, means to slide and raise said bar to expose said teeth for engagement with said rings, and the slots thereof, and means to manually operate said ratchet bar.

9. In a combination lock, a case, indicating dials carrying slotted rings rotatably mounted in said case, a bolt slidably mounted in said case, a toothed ratchet bar slidably mounted in said bolt, means to provide a diagonal sliding movement to said bar, wherewith to expose the teeth for engagement with said rings as said bar is retracted, and to conceal said teeth out of engagement with said rings as said bar is advanced, said means restricting the movement of said bar with relation to said bolt, and means to manually operate said bar.

10. In a combination lock, a case, indicating dials carrying slotted tubular rings rotatably mounted in said case, a ratchet bar slidably mounted in said bolt, said ratchet bar designed for partial movement without effecting said bolt, and to carry said bolt with it to a completion of said movement, a safety catch attached to said bolt, and means to manually operate said bar.

In testimony whereof I affix my signature.

ROBERT R. WILSON.